United States Patent [19]

Brown

[11] 4,243,919
[45] Jan. 6, 1981

[54] MOTOR BRAKING ARRANGEMENT

[75] Inventor: Jack Brown, Union, N.J.

[73] Assignee: The Singer Company, Stamford, Conn.

[21] Appl. No.: 136,004

[22] Filed: Mar. 31, 1980

[51] Int. Cl.³ ............................................. H02P 3/14
[52] U.S. Cl. .................................. 318/269; 318/250; 318/364
[58] Field of Search ............... 318/249, 250, 251, 258, 318/261, 269, 273, 308, 364, 365, 379, 380, 381

[56] References Cited

U.S. PATENT DOCUMENTS

| 3,566,229 | 2/1971 | Wickens | 318/308 |
| 3,919,611 | 11/1975 | Takahashi et al. | 318/380 |
| 4,179,646 | 12/1979 | Russell | 318/364 |

Primary Examiner—Gene Z. Rubinson
Assistant Examiner—John W. Redman
Attorney, Agent, or Firm—David L. Davis; Robert E. Smith; Edward L. Bell

[57] ABSTRACT

An SCR motor speed control system is provided with circuitry for fast braking of the motor. The circuitry senses when it is desired to stop the motor and simultaneously short circuits the motor armature and applies half-wave rectified line voltage to the motor field windings.

5 Claims, 1 Drawing Figure

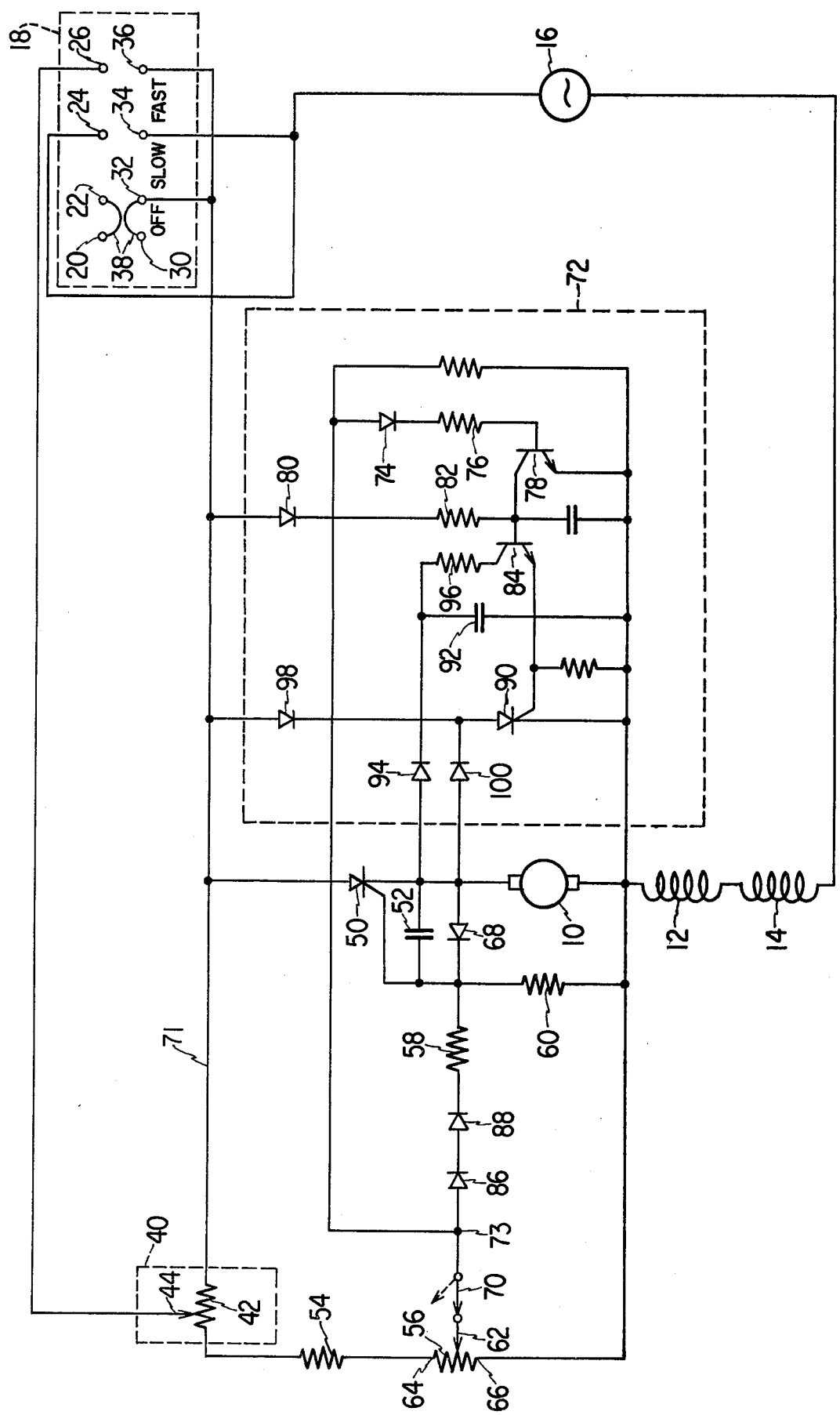

MOTOR BRAKING ARRANGEMENT

BACKGROUND OF THE INVENTION

This invention relates to motor control systems and, more particularly, to a braking arrangement for use with a universal motor driven by an SCR phase control circuit.

There are many applications where it is desired to quickly decelerate a motor for fast stopping thereof. For example, in a sewing machine, when an operator releases the foot controller it is desirable to bring the sewing machine to a complete halt relatively quickly so that unwanted stitches are not sewn. Additionally, when a sewing machine is to be stopped with the needle in a predetermined position, such as up or down, the sewing machine must be quickly stopped when the needle reaches the desired position after the operator releases the foot controller.

It is therefore an object of this invention to provide a braking arrangement for a motor which results in quick stopping of the motor.

It is possible to quickly stop a motor by applying a mechanical brake. However, this is not entirely satisfactory due to heat buildup and wear of parts.

It is therefore another object of this invention to provide an electrical braking arrangement for a motor.

In the prior art, many electrical braking arrangements for a motor are known. For example, it is a well known technique to brake a motor by short circuiting the armature. It is also known to maintain current through the field windings when the motor armature is short circuited. Both of these techniques result in a rapid braking of the motor. However, the known implementations of these techniques have not been entirely satisfactory as for example by requiring relatively complex and expensive circuitry.

It is therefore a further object of this invention to provide an efficient circuit for rapidly braking a motor.

SUMMARY OF THE INVENTION

The foregoing and additional objects are attained in accordance with the principles of this invention by providing circuitry which senses when an operator actuated speed controller signals that the motor is to be stopped. The circuitry simultaneously short circuits the motor armature and applies half-wave rectified line voltage to the motor field windings. The rectified current passing through the field windings creates a magnetic field and the motor armature rotating in this field generates a voltage proportional to the magnetic field and speed. The short circuit across the motor armature allows current to flow in the armature winding, and this current flow reacts with the magnetic field to create a counterelectro-magnetic force and hence, a braking torque. The circuitry includes a controllable switch in parallel with the motor armature and in series with the field windings. As long as the speed controller indicates that the motor is to be run, the controllable switch is maintained open. Timing means is provided which is enabled when the motor is run and is then responsive to an indication that the motor is to be stopped for closing the controllable switch for a predetermined time.

BRIEF DESCRIPTION OF THE DRAWING

The foregoing will be more readily apparent upon reading the following description in conjunction with the single FIGURE of the drawing which is a schematic circuit diagram of a motor speed control system incorporating an arrangement embodying the principles of this invention.

DETAILED DESCRIPTION

Referring now to the drawing, shown therein is a circuit for controlling the speed of a motor having an armature winding 10 and field windings 12 and 14. The motor windings are serially connected to a cyclically varying power supply 16 through a speed range selector switch assembly 18. The power supply 16 may be commercially available 115 volt 60 hertz power.

The assembly 18 permits the selection of a fast speed or a slow speed motor operating range. Toward that end, the assembly 18 has two sets of terminals 20, 22, 24, 26 and 30, 32, 34, 36, and a sliding wiper 38 for connecting any two adjacent terminals in each set to each other. The motor speed ranges are controlled by a potentiometer 40. When the wiper 38 is in the OFF position, the power supply 16 is disconnected from all of the motor speed control circuitry. When the wiper 38 is in the SLOW position, the current from the power supply 16 flows through the entire resistance 42 of the potentiometer 40 to the motor speed controller circuitry. When the wiper 38 is in the FAST position, current from the power supply 16 flows through the wiper 44 and through only the left hand portion of the resistance 42.

Serially interposed between the power supply 16 and the motor windings 10, 12 and 14, is a silicon controlled rectifier (SCR) 50. When triggered into conduction, the SCR 50 allows current to flow through the motor windings 10, 12, and 14 during the positive half cycles of the power supply 16. To trigger the SCR 50 into conduction, there is provided a firing circuit which includes a charging capacitor 52 and a current control circuit comprising the resistors 54, 56, 58 and 60. The charging capacitor 52 is connected across the gate and cathode of the SCR 50 and, as is well known in the art, when the voltage across the charging capacitor 52 reaches a predetermined threshold level, the SCR 50 is triggered into conduction. Within a positive half-cycle of the power supply 16, the sooner the voltage across the charging capacitor 52 reaches that predetermined threshold value, the sooner the SCR 50 is triggered into conduction and the more current flows through the motor windings 10, 12 and 14. Therefore, to increase the motor speed, the charging capacitor 52 is charged more quickly so that the SCR 50 is triggered earlier in the positive half-cycle and to drive the motor slower, the capacitor 52 is charged at a slower rate so as to trigger the SCR 50 at a later point in the positive half-cycle.

The rate at which the capacitor 52 is charged is determined by the setting of the tap 62 of the potentiometer 56, once the speed range for the motor has been set by the assembly 18. The charging path for the capacitor 52 is through the resistor 54, through the potentiometer 56, through the tap 62, through the resistor 58, through the capacitor 52, through the armature winding 10, and through the field windings 12 and 14. Therefore, the closer that the tap 62 is to the end 64 of the potentiometer 56, the lower the charging path resistance and the faster the charging rate of the capacitor 52. The motor will then run faster. Conversely, the closer that the tap 62 is to the end 66 of the potentiometer 56, the greater the charging path resistance and the slower the charging rate of the capacitor 52. The motor will then run slower. During the negative half-cycles of the power supply 16, the capacitor 52 discharges through the gate-cathode path of the SCR 50 and through the resistor 60 and the armature winding 10. The diode 68 prevents excessive reverse voltage from appearing across the cathode-gate of the SCR 50.

The aforedescribed circuit is self regulating in that prior to the firing of the SCR 50, as the armature winding 10 rotates through the residual magnetic fields set up by the field windings 12 and 14, a back EMF is generated in opposition to the capacitor charging path which is directly proportional to the speed of rotation of the armature winding 10. This voltage on the armature winding 10 prior to firing the SCR 50 bucks the flow of charging current to the capacitor 52 and causes a longer time to elapse before the voltage across the capacitor 52 reaches the firing voltage of the SCR 50. This automatically retards the firing angle, allowing the motor to reach a stable equilibrium speed. If a load is now applied to the motor, its speed tends to decrease, reducing the residual induced voltage in the armature winding 10 and automatically advancing the firing angle. This increases motor torque to handle the increased load and maintains motor speed essentially constant.

The aforedescribed circuitry is well known in the prior art. When utilized to drive a sewing machine main drive motor, the potentiometer 56 is typically situated within a foot controller which causes the tap 62 to be moved from the end 66 to the end 64 as foot pressure on the controller is increased. Additionally, it is conventional that the foot controller be further equipped with a switch 70 which is closed whenever at least a minimal pressure is applied to the foot controller and is opened (as shown in phantom) when all external pressure is removed from the foot controller. With such an arrangement, when an operator releases the foot controller and opens the switch 70, power is removed from the motor and it coasts to a stop, being braked by its own internal frictional forces and the frictional forces of the mechanism to which it is coupled. As described above, there are many instances where it is desirable to quickly brake the motor to a stop. Thus, in accordance with the principles of this invention, the circuitry 72 shown within the dotted lines is provided to sense the opening of the switch 70 and cause the motor to quickly come to a stop. In essence, when it is sensed that the foot controller has been released, resulting in the switch 70 being opened, half-wave rectified line voltage is supplied for a short time to the motor field windings 12 and 14. At the same time, the motor armature winding 10 is short circuited. The rectified current passing through the field windings 12 and 14 creates a magnetic field whose wave shape is similar to the current. The motor armature winding 10, rotating in this field, generates a voltage proportional to the magnetic field and speed. The short circuit across the armature winding 10 allows current to flow in the winding 10, and this current flow reacts with the magnetic field to create a counterelectro-magnetic force and hence a braking torque.

With the foot controller depressed so that the switch 70 is closed, when the voltage on the line 71 is positive, a positive voltage appears at the point 73. At a sufficient depression of the foot controller so that the tap 62 of the potentiometer 56 is sufficiently far away from the end 66, the voltage at the point 73 causes current to flow through the diode 74 and the resistor 76 into the base of the transistor 78, causing the transistor 78 to conduct. When the transistor 78 conducts, current flows through the diode 80 and the resistor 82 from the collector to emitter of the transistor 78. This diverts current from the base of the transistor 84 so that no current can flow from the collector to the emitter of the transistor 84. The presence of the rectifiers 86 and 88 insures that conduction of the transistor 78 occurs even when the voltage at the point 73 is too low to cause the SCR 50 to trigger. The voltage temperature coefficient of the diodes 86 and 88 is similar to that of the diode 74 and that of the base-emitter junction of the transistor 78 so that the operation of the circuitry is not temperature sensitive if the parts are at the same ambient temperature. Since the transistor 84 does not conduct, no current is supplied to the gate of the SCR 90 and thus the SCR 90 does not conduct. While the motor is running, the armature voltage is used to charge the capacitor 92 through the diode 94. The capacitor 92 cannot discharge because the transistor 84 is not conductive.

When the foot controller is subsequently released to open the switch 70, this terminates the flow of current through the diode 74 and resistor 76 to the base of the transistor 78, thus rendering the transistor 78 nonconductive. When the voltage on the line 71 becomes positive (unless it already is positive), current will flow through the diode 80 and the resistor 82 to the base of the transistor 84, since the transistor 78 is no longer conductive and no longer diverts current from the base of the transistor 84. The transistor 84 then conducts and discharges the capacitor 92 through the resistor 96. The current from the capacitor 92 will flow through the resistor 96 and through the collector-emitter path of the transistor 84 to the gate of the SCR 90. The SCR 90 is thereby triggered into conduction. Current then flows through the diode 98 and through the SCR 90 to the field windings 12 and 14. At the same time, the armature winding 10 is short circuited through the diode 100 and the SCR 90. The SCR 90 will conduct during every positive half-cycle of the line voltage until the charge on the capacitor 92 is exhausted, after which the voltage which is supplied to the gate of the SCR 90 is too small to cause triggering. The simultaneous short circuiting of the armature and the application of power to the field windings causes the motor to be very quickly braked. As discussed above, the rectified current passing through the field windings 12 and 14 creates a magnetic field and the armature winding 10 rotating in this field generates a voltage proportional to the magnetic field and speed. The short circuit across the armature winding 10 allows current to flow in the winding 10, and this current flow creates a counterelectro-magnetic force which reacts with the magnetic field to create a braking torque. By the time the charge on the capacitor 92 is exhausted, the motor is completely stopped.

Although the described circuitry has been shown as including a switch 70 in series with the tap 62 of the speed control potentiometer 56, such a switch is not necessary for successful operation of an arrangement constructed in accordance with the principles of the present invention. The transistor 78 compares the voltage at the point 73 with the voltage on the line 71. These two voltages are AC voltages of the same phase but at different levels. The transistor 78 is conductive so long as these voltages are both positive and the voltage at the point 73 is above a minimum level which is sufficient for triggering the SCR 50 to run the motor. However, whenever the foot controller is relaxed to cause the wiper 62 to get so close to the end 66 of the potentiometer 56 that the voltage at the point 73 is below the minimum level and is insufficient to trigger the SCR 50, as soon as the voltage on the line 71 goes positive, the braking action is initiated due to the nonconduction of the transistor 78 and the conduction of the transistor 84.

It is to be noted that the motor must first be run in order to activate the braking operation. Such braking operation will not occur when power is first turned on, for example, because in order for the capacitor 92 to be charge, the motor must be running. When the motor is running, the capacitor 92 is charged almost instantaneously.

The aforedescribed arrangement possesses certain advantages. First, a small inexpensive timing capacitor 92 can be utilized. This capacitor only has to supply gate current for the SCR 90. Additionally, a single element, i.e. the SCR 90, operates to both short circuit the armature winding and supply field current.

Accordingly, there has been disclosed an arrangement for fast braking of an SCR driven motor. It is understood that the above-described embodiment is merely illustrative of the application of the principles of this invention. Numerous other embodiments may be devised by those skilled in the art without departing from the spirit and scope of this invention, as defined by the appended claims.

I claim:

1. In combination with a motor control system for operating a motor at preselected speeds, said motor having serially connected armature and field windings, and including means for connecting said system to a cyclically varying power supply, a phase control circuit connected between said motor and said power supply, and a firing circuit coupled to said phase control circuit for phase firing said phase control circuit to supply power to said motor during a portion of the cycle of said power supply, said firing circuit including operator actuable speed control means for providing a speed control signal indicative of an operator desired speed for said motor, said speed control signal varying in phase with said power supply and at a level corresponding to said desired speed, said phase control circuit requiring at least a minimum level of said speed control signal in order to supply power to said motor, wherein the improvement comprises an arrangement for electrically braking the motor comprising:

a controllable switch connected across the armature winding of the motor and between the field windings and said power supply; and timing means enabled when the motor is run and thereafter responsive to said speed control signal being below said minimum level for closing said controllable switch for a predetermined time, whereby said controllable switch simultaneously short circuits said armature winding and provides a path between said field windings and said power supply.

2. The arrangement according to claim 1 wherein said controllable switch includes a silicon controlled rectifier.

3. The arrangement according to claim 2 wherein said timing means includes a capacitor, means for charging said capacitor only when power is supplied to said motor by said phase control circuit, a second controllable switch for selectively providing a path for the charge from said capacitor to be conducted to the gate of said silicon controlled rectifier and control means for rendering said second controllable switch nonconductive when said speed control signal is above said minimum level and for rendering said second controllable switch conductive when said speed control signal is below said minimum level.

4. The arrangement according to claim 3 wherein said second controllable switch includes a first transistor having its collector-emitter path serially connected between said capacitor and said gate of said silicon controlled rectifier and said control means includes a second transistor having its base in circuit connection with said speed control means and arranged to be conductive and divert current from the base of said first transistor when said speed control signal is above said minimum level and be nonconductive and allow current to flow to the base of said first transistor when said speed control signal is below said minimum level.

5. The arrangement according to claim 4 wherein said firing circuit includes a switch contact which is adapted to be closed when the operator desires the motor to run and which is adapted to be open when the operator desires the motor not to run, said switch contact being in a series path for said speed control signal intermediate said speed control means and said phase control circuit, and the base of said second transistor is connected to a point intermediate said switch contact and said phase control circuit.

* * * * *